June 4, 1963 P. S. HARDY 3,092,411
SPATULA
Filed July 14, 1961
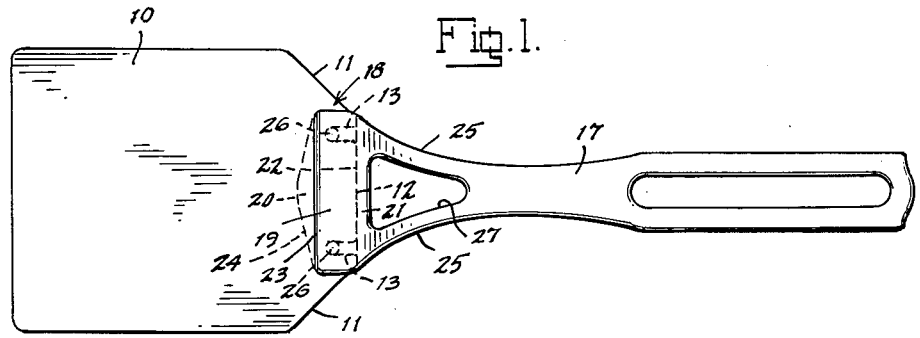
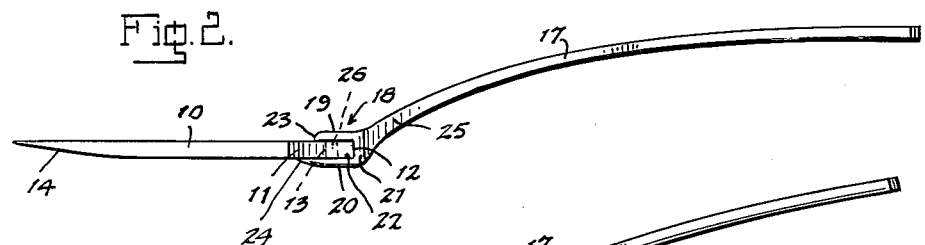
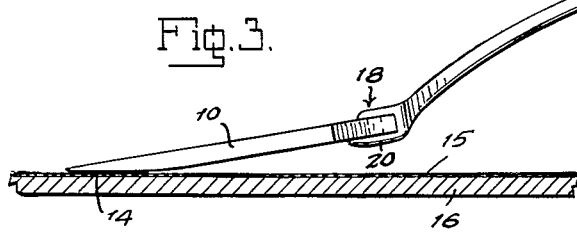
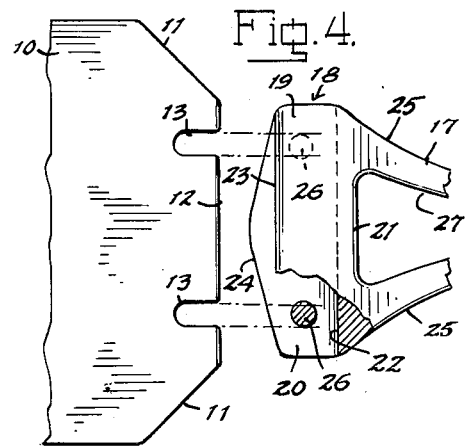
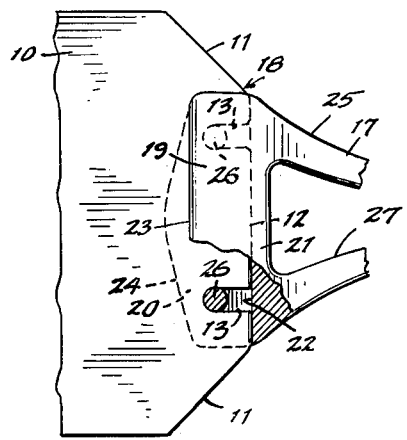
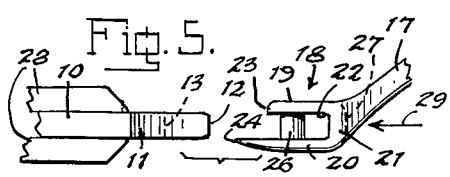
*INVENTOR.*
PETER S. HARDY
BY
*ATTORNEY.*

United States Patent Office 3,092,411
Patented June 4, 1963

3,092,411
SPATULA
Peter S. Hardy, Trumbull, Conn., assignor to Peerless Aluminum Foundry Co., Inc., Bridgeport, Conn., a corporation of Connecticut
Filed July 14, 1961, Ser. No. 124,133
2 Claims. (Cl. 294—7)

The present invention relates to a spatula. Certain cooking utensils, as frying pans, are presently in use having a plastic coating, sometimes known under the name "Teflon," which enables the use of the utensil for frying without the use of grease. Such coating is subject to damage by scratching if engaged by a sharp edged metallic spatula and it has consequently been the practice with such utensils to employ a wooden spatula. Such wooden spatulas have for the most part consisted of a single piece of wood shaped to provide a blade and an integral handle.

It is an object of the present invention to provide a spatula having a wood blade and a separate handle of cast aluminum, molded plastic, or similar material, which my be economically fabricated in relatively thin curved shapes not practical with a wood handle. A further object is to provide a spatula which enables the wood blade to be readily replaced when through usage it becomes worn, split or otherwise damaged. Another object is to provide improved means for securing the wood blade to the handle without the use of rivets, screws, or the like, and which will effectually retain the connection between the blade and the handle and protect the blade against splitting.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

FIG. 1 is a plan view of a spatula according to the invention;

FIG. 2 is a side elevation;

FIG. 3 is a side elevation showing the spatula in engaged relation with a coated cooking utensil, the latter being shown in vertical section;

FIG. 4 is a fragmentary plan view on an enlarged scale of the blade and handle in separated relation, the handle being shown partially in horizontal section;

FIG. 5 is a side elevation of the parts as seen in FIG. 4 and also showing the manner in which the blade may be held during assembly and the manner in which the handle may be assembled therewith; and FIG. 6 is a fragmentary plan view also on an enlarged scale of the parts as seen in FIG. 4 in their assembled relation, the handle being shown partially in horizontal section.

Referring to the drawings, the spatula, according to the exemplary embodiment of the invention illustrated therein, comprises a blade member 10 consisting of a slab of suitable hard wood of generally rectangular shape and of suitable thickness having its grain running longitudinally of the slab, the corners of the slab at its handle attaching end being diagonally cut, as at 11—11, to provide a reduced length intermediate transverse rearward edge 12 which is provided adjacent each of the diagonally cut edges 11 with a U-shaped notch 13 extending inwardly from the edge 12 in the longitudinal direction of the slab.

The lower side of the slab is beveled as at 14 adjacent the forward transverse edge of the slab so that the outer end of the blade is tapered in cross section to a relatively sharp edge, the angle of this beveled portion being predetermined so that when it is engaged in flat relation with the coated surface 15 of a pan 16, as seen in FIG. 3, the blade is disposed at a predetermined angle to space its handle attached end from the pan surface, for a purpose presently to more fully appear.

The handle member 17 is formed of cast aluminum, molded plastic, or other suitable material, and is curved upwardly and rearwardly from a forward clamping head 18 substantially corresponding in width to the length of the rearward edge 12 of the blade member and comprising an upper flange 19 and a lower flange 20 spaced a distance apart substantially corresponding to the thickness of the rearward marginal end portion of the blade member, and a transverse wall 21 connecting the inner ends of the flanges to provide a recess 22 for receiving said rearward marginal end portion of the blade member. The forward edge 23 of the flange 19 is preferably straight, while the forward edge 24 of the flange 20 is preferably of V-shape and forwardly offset with respect to the edge 23. The side edges 25—25 of the handle preferably curve away from the diagonal edges 11 of the blade member in a substantially continuous line therewith in the assembled relation as seen in FIG. 1.

A pair of vertical cylindrical pins 26 extend between the flanges 19 and 20 and are integrally formed therewith, these pins being substantially aligned with the notches 13 of the blade member and being spaced outwardly from the inner wall 21 of the recess 22, so that in the engaged relation of the blade member with the handle member the pins are received in the forward ends of the notches 13 and the edge 12 of the blade member engages with the inner wall of the recess 22. Adjacent the head 18 of the handle member there is provided an opening 27, preferably triangular in shape, and arranged with respect to the curvature of the handle away from the head portion so that the outer surface of the transverse wall 21 of the head portion constituting the forward wall of the opening 27 is clear in a longitudinal direction normal to the wall surface 21, for a purpose presently to more fully appear.

As seen in FIG. 4 the pins 26 are slightly larger in diameter than the width of the notches 13, the spacing between the inner sides of the two pins is slightly less than the spacing between the inner sides of the two notches, and the spacing between the outer sides of the two pins is preferably equal to but not greater than the spacing between the outer sides of the two notches. This spaced relation is indicated by the dot-and-dash lines in FIG. 4.

In assembling the handle member with the blade member, the blade member is preferably clamped between the jaws 28—28 of a suitable vise, as seen in FIG. 5, with the notched end portion of the blade member projecting from the vise and thereupon the head of the handle member is brought into arrangement with the blade member, the projected edge 24 of the flange 20 serving to guide the edge 12 between the flanges to bring the outer ends of the notches 13 into relation with the pins 26. Thereupon the curved surfaces of the cylindrical pins serve to guide them into the notches and pressure is applied to the outer surface of the wall 21 in the direction of the arrow 29, as indicated in FIG. 5, to force the pins into the notches to the point where they engage the forward ends of the notches and the edge 12 of the blade member engages the inner wall 21 of the recess 22. Thus the simultaneous engagement of the two pins 25 in the notches compresses the wood section between the notches so that there is no possibility of splitting the wood during assembly, and following assembly the blade is firmly held by the pins and the flanges against splitting or accidental separation from the handle. The natural property of the wood to slightly expand after being forcibly compressed causes the section between the notches 13 to slightly expand in back of the engaged pins to positively lock the blade in position.

In the event that the blade becomes worn or otherwise damaged it may be readily forced out of the handle and a new blade assembled therewith in the manner above outlined.

In the use of the spatula as seen in FIG. 3 it will be observed that when the beveled surface 14 is in flat engagement with the coated surface 15 of the utensil 16 the blade is disposed at such inclination that the flange 20 of the handle is positioned away from the coated surface, so that in the normal use of the spatula there is no likelihood of the coated surface being damaged through contact of the flange 20 therewith.

What is claimed is:

1. A spatula of the character described, comprising a blade member in the form of a slab of grained wood having longitudinal side edges substantially parallel to its grain direction, transverse forward and rearward edges, and a transversely extending rearward marginal portion having parallel upper and lower surfaces, there being a pair of identical notches opening to said rearward edge and extending forwardly therefrom in parallel relation to each other into said rearward marginal portion of said blade member, said notches being transversely spaced from each other and equally spaced inwardly from said longitudinal side edges and each having parallel inner and outer side walls substantially parallel to said grain direction, a handle member including a head portion and a handle portion extending rearwardly therefrom, said head portion comprising upper and lower rigid flanges having opposed parallel inner surfaces spaced apart a distance substantially corresponding to the thickness of said rearward marginal portion of said blade member, and a transverse wall integral with and connecting said flanges and defining therewith a recess open at its forward end in which said rearward marginal portions of said blade member is received, and a pair of circular cross-section transversely spaced rigid pins integral with and extending perpendicularly between said opposed parallel inner surfaces of said flanges and engaged in said notches of said blade member, said pins beings equally spaced forwardly from said transverse wall a distance no greater than the longitudinal dimension of said notches, the spacing of the transversely opposite inner sides of said pins from each other being less than the spacing of the transversely opposite inner walls of said notches from each other, and the spacing of the transversely opposite outer sides of said pins from each other being no greater than the spacing of the transversely opposite outer walls of said notches from each other, whereby said rigid pins transversely clamp said rearward marginal portion of said blade member disposed between said notches and imbed into said inner side walls of said notches through the inherent ability of wood to compress and expand.

2. A spatula as defined in claim 1, further characterized in that said handle portion is integrally connected at transversely spaced points to said transverse wall of said head portion and extends in an upwardly and rearwardly inclined direction therefrom, there being a clearance opening in said handle portion exposing the outer surface of said transverse wall intermediate said spaced points to thereby present a clearance space extending rearwardly from said intermediate outer surface in a direction normal thereto beyond the outer end of said handle portion to enable a driving tool disposed in said clearance space to engage said intermediate outer surface in longitudinal line with said recess and said blade member engaged therein.

References Cited in the file of this patent

UNITED STATES PATENTS

| 382,591 | Cowles | May 8, 1888 |
| 649,493 | Stohlmann et al. | May 15, 1900 |
| 697,183 | Stout | Apr. 8, 1902 |
| 990,748 | Kniffen | Apr. 25, 1911 |
| 1,100,394 | Parker | June 16, 1914 |
| 1,570,191 | Wyremliek | Jan. 19, 1926 |
| 2,519,946 | Voelker et al. | Aug. 22, 1950 |
| 2,634,664 | Benner | Apr. 14, 1953 |
| 2,671,668 | Krause et al. | Mar. 9, 1954 |
| 2,800,089 | Seils | July 23, 1957 |
| 3,021,627 | Johns | Feb. 20, 1962 |

FOREIGN PATENTS

| 221,099 | Australia | Mar. 31, 1959 |